Patented Oct. 11, 1932

1,882,551

UNITED STATES PATENT OFFICE

HENRY GAULT AND BERNARD MARIUS ROBERT ANGLA, OF LYON, FRANCE, ASSIGNORS TO SOCIETE DES USINES CHIMIQUES RHONE-POULENC, OF PARIS, FRANCE

PROCESS OF MANUFACTURE OF CELLULOSE ESTERS

No Drawing. Application filed December 4, 1929, Serial No. 411,672, and in Great Britain December 31, 1928.

The invention has for its object a process of manufacture of new cellulose esters consisting in treating the cellulose or its near transformation products by means of crotonic anhydride, in presence of acetic acid and of a catalyst, and, eventually, in presence of a solvent or of a diluent.

In U. S. A. application Serial No. 410,874 a process of manufacture of crotonic cellulose esters is described, consisting in treating cellulose with crotonic anhydride in presence of catalysts, and it has been shown that the esterification may be effected in presence of solvents of the crotonic ester to be obtained. It has been ascertained that, if the process of the application referred to above is carried out in presence of acetic acid, instead of pure cellulose crotonates, mixed acetocrotonic esters are obtained. Processes of manufacture of cellulose esters are known in which cellulose is treated by the anhydride of an organic acid in presence of a catalyst, and of an organic acid different from that which corresponds to the anhydride used (see for example D. R. P. 203,642, 206,950; U. S. A. Patent 891,218; French Patent 532,146). These processes give mixed cellulose esters, as has been ascertained by the experts (see Clement & Riviere "La Cellulose", Paris, 1920, page 104). However, no indications are found in the current literature concerning the case where the anhydride used is the anhydride of a non-saturated organic acid.

In carrying out the present invention, it is possible to obtain a whole gamut of mixed esters, from the esters having a high crotonic and a low acetic content, up to the esters having a low crotonic and a high acetic content, according to the proportion of acetic acid to the crotonic anhydride, and according to the conditions under which the operation is carried out. It is permissible to use as starting cellulosic material, for the preparation of the mixed compounds, either unaltered celluloses, such as cotton or wood pulp having possibly been subjected to purification treatment, or modified celluloses, such as, for example, hydrocellulose, oxycellulose or hydrocellulose. In any case, it is preferable to subject the fibres to a preliminary treatment having for its effect to render the reaction more uniform. For example, it is possible to proceed to a preliminary impregnation of the cellulosic fibres with acetic acid containing, if desired, the whole or a fraction of the catalyst; a particularly advantageous and effective preliminary treatment consists in impregnating the cellulose or its near transformation products with a quantity of acetic acid which is less than their weight. The catalysts generally used for the preparation of cellulose esters may be used for the present process; for example, sulphuric acid, aliphatic or aromatic sulphonic acid, acid salts, such as the bisulphates, zinc chloride and perchlorates, etc. may be mentioned.

The aceto-crotonates of cellulose obtained according to this invention have different solubilities according to their content of crotonic acid. For instance, the esters having a high crotonic content and a low crotonic content have solubilities which approach those of pure cellulose crotonates; they are, for example, soluble in benzene and mixtures of benzene and alcohol. On the contrary, esters with a high acetic and low crotonic content are insoluble, for example, in benzene or in benzene-alcohol, but their solubilities are similar to those of cellulose acetates; they may, for example, be soluble in acetone.

The aceto-crotonates of cellulose obtained in conformity with the invention may be used in the same way as the cellulose crotonates obtained by the process of the co-pending U. S. A. application Serial No. 410,874.

The examples given hereafter are illustrating the process but are in no wise limitative; the parts are by weight:

*Example 1.*—100 parts of a hydrocellulose are impregnated with 25 parts of acetic acid at ordinary temperature for at least two hours. They are then introduced into an esterifying bath consisting of:

500 parts of crotonic anhydride,
400 parts of crotonic acid,
50 parts of zinc chloride.

The mixture is stirred at ordinary temperature for about 20 hours and the temperature is then raised to 75° C. without stopping the stirring. A viscous solution, free from fibres, is then formed in less than three hours, from which the aceto-crotonic cellulose ester is extracted by precipitation with water or with any other suitable agent. The product so obtained contains less than 10% of combined acetic acid; it is soluble in benzene, benzene containing alcohol, acetone, chloroform, acetic acid; it is insoluble in water, alcohol, ether and ligroin. Its solutions give by evaporation flexible and strong films.

*Example 2.*—100 parts of hydrocellulose are impregnated at ordinary temperature with 25 parts of acetic acid for at least 2 hours; they are then introduced into an esterifying bath consisting of:

500 parts of crotonic anhydride,
300 parts of acetic acid,
50 parts of zinc chloride.

The mixture is stirred at ordinary temperature for about 20 hours. The temperature is then raised to 75° C. for about 3 hours without discontinuing the stirring and a clear and viscous solution is obtained, from which the aceto-crotonic ester is precipitated by the addition of an excess of water or of any other suitable agent.

The product so obtained is soluble in acetone, ethyl acetate, chloroform, acetic acid. Its collodions give by evaporation homogeneous, colourless, flexible films having good resisting qualities. It is an aceto-crotonate of cellulose which has a constitution approaching that of cellulose diacetomonocrotonate.

*Example 3.*—100 parts of cotton are impregnated with 25 parts of acetic acid, and then introduced into an esterifying bath consisting of 1000 parts of crotonic anhydride and 50 parts of methane-sulphonic acid. The mixture is heated to 70–75° C. while stirring; at the end of a few hours a viscous solution is obtained in this manner, from which the cellulose aceto-crotonic ester is separated by precipitation with water.

The product obtained is a cellulose aceto-crotonic ester of low acetic content. It is soluble in benzene, toluene, acetone and glacial acetic acid.

*Example 4.*—100 parts of cellulose are impregnated with 25 parts of acetic acid at ordinary temperature for several hours. The cellulose treated in this manner is introduced into an esterifying bath consisting of:

500 parts of crotonic anhydride,
500 parts of benzene,
140 parts of methane-sulphonic acid.

The mixture is stirred at ordinary temperature for 3 to 4 hours. A viscous, clear solution, free from fibre, is obtained, from which the aceto-crotonic ester is extracted by precipitation with alcohol. The product so obtained, after being washed and dried, is soluble in acetone, chloroform, ethyl acetate, acetic acid, and benzene containing alcohol. Its collodions give by evaporation flexible and strong films.

*Example 5.*—A modified cellulose is prepared in accordance with the specification of British Letters Patent No. 13696/1914 in the following manner: 100 parts of cotton are stirred for 2 hours with 525 parts of glacial acetic acid; a mixture is then added, consisting of 100 parts of acetic acid, 5 parts of sulphuric acid and 60 parts of acetic anhydride, and the whole is stirred for 2 hours at ordinary temperature. In this manner the cotton is transformed into a modified cellulose which is particularly adapted to esterification. 390 parts of crotonic anhydride are then added to the whole mass; stirring is carried out for 1 hour at ordinary temperature and continued for another hour at 45° C.; a viscous, clear solution, free from fibres, is obtained, from which the aceto-crotonate of cellulose is extracted by precipitation with any suitable agent.

The product obtained, after being washed and dried, is in the form of granules or white, compact scales, soluble in acetone chloroform containing alcohol, and acetic acid, and insoluble in water, alcohol, ether, benzene, toluene. It is generally a cellulose diaceto-monocrotonate. By evaporating its solutions, transparent, colourless, flexible and strong films are obtained.

What we claim and desire to secure by Letters Patent is:—

1. A process of manufacture of cellulose esters consisting in treating the cellulose with crotonic anhydride, in the presence of acetic acid and of a catalyst.

2. A process of manufacture of cellulose esters consisting in treating the cellulose with crotonic anhydride, in the presence of acetic acid and of a catalyst, with a solvent.

3. A process of manufacture of cellulose esters consisting in treating the cellulose with crotonic anhydride, in the presence of acetic acid and of a catalyst, with a diluent.

4. A process of manufacture of cellulose esters consisting in treating the cellulose with crotonic anhydride, in the presence of acetic acid and of a catalyst, with a solvent and a diluent.

5. A process of manufacture of cellulose esters as claimed in claim 1 in which the cellulose fibres have been subjected to a preliminary treatment having for its effect to render the reaction more uniform.

6. A process of manufacture of cellulose esters as claimed in claim 1 in which the cellulose fibres are preliminarily impregnated with a portion of the acetic acid which is to be used in the reaction.

7. A process of manufacture of cellulose esters as claimed in claim 1 in which the cellulose fibres are preliminarily impregnated with a portion of the acetic acid which is to be used in the reaction in the presence of a catalyst.

8. A process of manufacture of cellulose esters as the cellulose fibres are preliminarily impregnated with a portion of the glacial acetic acid claimed in claim 1 in which is to be used in the reaction the quantity of glacial acetic acid being less than the weight of cellulose.

9. A process of manufacture of cellulose esters as claimed in claim 1 in the presence of one of the catalysts used generally for the esterification of cellulose.

10. A process of manufacture of cellulose esters as claimed in claim 1 in the presence of a sulphonic acid.

11. A process of manufacture of cellulose esters as claimed in claim 1 in the presence of an aliphatic sulphonic acid.

In testimony whereof we have signed our names to this specification.

HENRY GAULT.
BERNARD MARIUS ROBERT ANGLA.